UNITED STATES PATENT OFFICE.

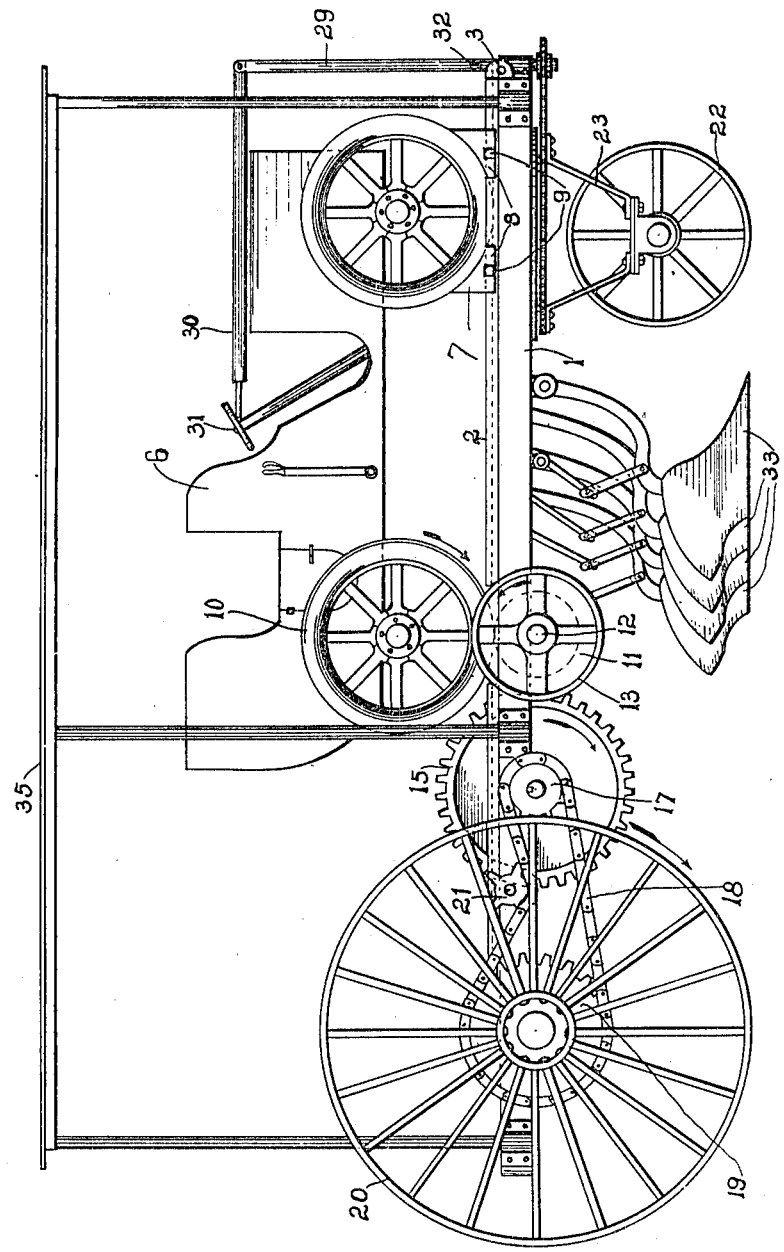

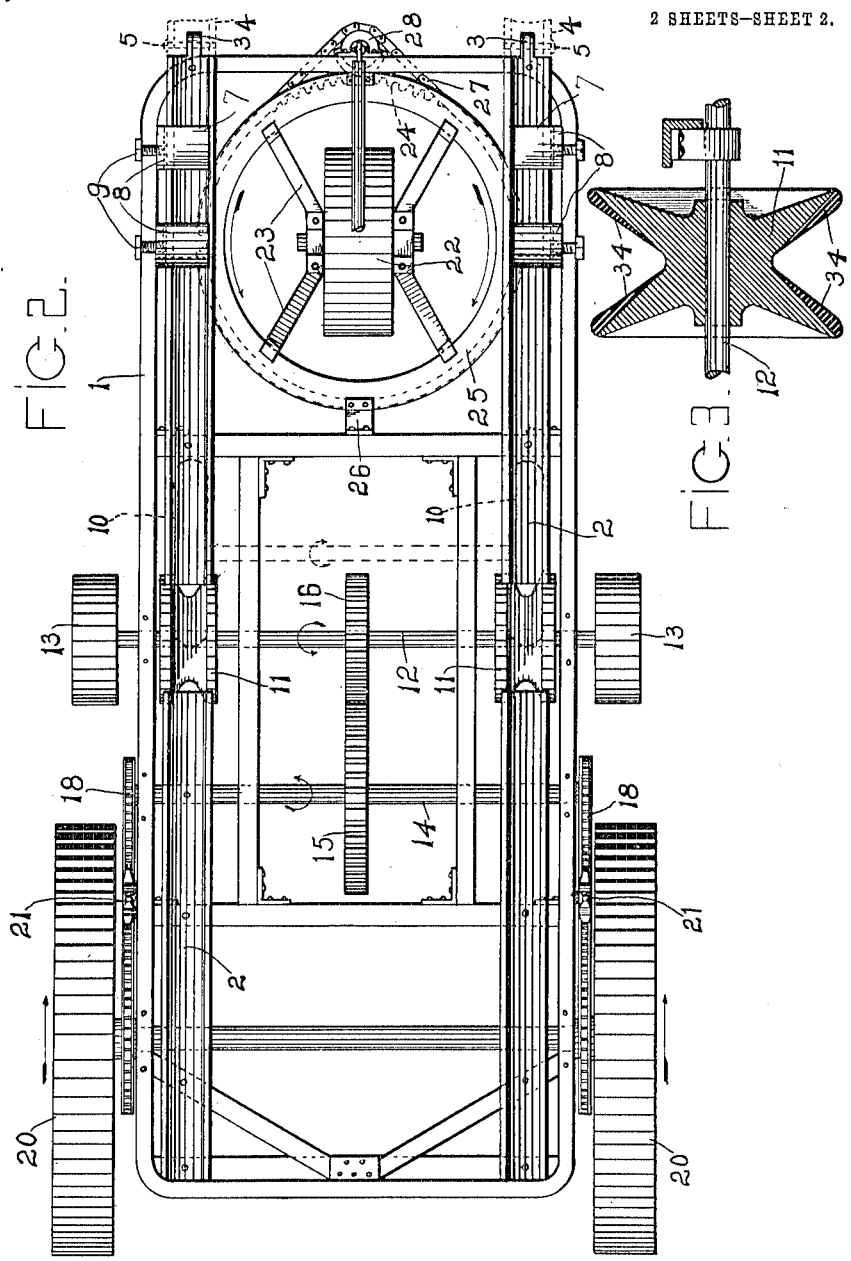

SIMON BELANGER, OF WARROAD, MINNESOTA.

TRACTION-PLOW.

1,080,673.   Specification of Letters Patent.   Patented Dec. 9, 1913.

Application filed January 10, 1913. Serial No. 741,169.

*To all whom it may concern:*

Be it known that I, SIMON BELANGER, a subject of the King of Great Britain, residing at Warroad, Minnesota, United States of America, have invented certain new and useful Improvements in Traction-Plows; and I do hereby declare that the following is a full, clear, and exact description of the invention, such as will enable others skilled in the art to which it appertains to make and use the same.

The invention to be hereinafter described relates to traction plows.

In order to more clearly disclose the construction, operation, and use of the invention, reference should be had to the accompanying drawings forming part of the present application.

Throughout the several figures of the drawings like reference characters designate the same parts.

In the drawings: Figure 1 is a side view of the device; Fig. 2 is a top plan view of the same; and Fig. 3 is a detail sectional view of the friction drive wheels.

Referring to the drawings in detail; the numeral 1 designates the usual traction frame, on which are mounted two parallel grooved rails 2 extending the length of the said frame, in two sections. The said grooved rails 2 are provided with lugs 3 on their forward ends, adapted to be received by the upper end of a second similarly grooved rail 4 and pivotally secured therein by a pin 5 passing through the end of the said rail 4 and the lug 3. The lower end of the said rails 4 rest on the ground, thus forming an inclined track by means of which an automobile 6 may be backed up on the two parallel grooved rails 2 on the frame 1 and secured in position by means of blocks 7 adapted to receive the front wheels of the said automobile. The lower faces of the blocks 7 are rounded to conform with the grooves of the rails 2. The said blocks are provided with side flanges 8 extending down over the outer face of the said rails and with binding screws 9 extending through the said side flanges and operating against the outer face of the rails 2. By loosening the binding screws 9, the blocks may be removed or moved along the rails 2 as desired.

When in operative position the hind wheels 10 of the automobile 6 are secured by and in frictional engagement with the grooved frictional drive wheels 11 placed between the inner ends of the two sections of the rails 2 and mounted on a shaft 12 rotated thereby; the said shaft being mounted across the frame 1 by any suitable means. On the outer ends of the said shaft 12 are mounted belt wheels 13 adapted to receive drive belts, and to do any ordinary belt work, either when the device is moving or stationary, in which latter case, the driving apparatus would of course be thrown out of gear. The second shaft 14 parallel to and in back of the shaft 12 is provided with a gear wheel 15 mounted at its center, and in mesh with a second gear wheel 16 mounted at the center of the shaft 12, and rotated thereby. On the outer ends of the shaft 14 are secured sprocket wheels 17. A sprocket chain 18 is passed around the said sprocket wheel 17 and around a sprocket wheel 19 mounted around the hub of the rear wheel 20 of the machine. The sprocket chain 18 is guided and held taut by an ordinary guide sprocket wheel 21 secured to the side of the frame 1. From the above description it will be clear that as the automobile wheels 10 are revolved forward the gear wheel 16 will revolve backward and will in its turn revolve the gear wheel 15 forward and of course the sprocket wheels 17 will be revolved forward, and in their turn will revolve the rear wheels 20 of the machine forward by means of the sprocket chain 18 and the sprocket wheels 19.

For guiding purposes the front wheel 22 is mounted in a frame 23 which is secured to a large horizontal sprocket wheel 24 which is free to turn on a fifth wheel 25 secured to the frame 1 by suitable braces 26. The sprocket wheel 24 may be turned as desired by means of a sprocket chain 27 passing around the said wheel and around a smaller sprocket wheel 28 mounted on the lower end of a vertical rod 29 secured to the front of the frame 1 and adapted to be turned by means of a handle 30 pivotally secured to the upper end thereof and at right angles thereto; the said handle 30 being of such a length as to enable it to be easily operated by any one sitting in the front seat of the automobile 6; but not long enough to be interfered with by the steering wheel 31 of the said automobile. The vertical rod 29 is pivotally jointed in its lower end, as at 32, in order that it may be folded down low enough to permit the automobile 6 to pass over it. It will be obvious that by swinging the handle 30 to either side, the front wheel 22 will be swung accordingly, and the machine may thus be easily guided.

Plows 33 are secured to the frame 1 by any suitable means; and when the machine is used for traction purposes only these plows may be lifted up out of the way by any suitable means provided for that purpose.

In case the friction between the automobile wheels 10 and the friction drive wheel 11 is insufficient, it may be increased by loosening the binding screws 9 of the blocks 7 and pushing the automobile back so that the wheels 10 rest squarely in the top of the friction drive wheels 11, so that the greater part of the weight of the automobile presses the two sets of wheels into very close frictional engagement; as shown in Fig. 1.

To prevent the friction drive wheels 11 from tearing the automobile tires, and to increase the grip of the said drive wheels on the tires, the drive wheels 11 are provided with hard rubber padding 34, on their inner faces, as shown in Fig. 3.

To protect the automobile and the machine from the weather, a roof 35 of canvas, sheet iron, or other suitable material is provided.

It is thought that the construction, operation, and use of the invention will be clear from the preceding detailed description.

Changes may be made in the construction, arrangement, and disposition of the several parts of the invention without in any way departing from the field and scope of the same, and it is meant to include all such within this application wherein only a preferred form has been disclosed.

Having thus fully described my invention, what I claim as new and desire to secure by Letters Patent is:

1. In a device of the character described, a frame, grooved compound tracks adapted to receive the wheels of an automobile, means for placing the automobile on the said tracks, adjustable blocks to secure the automobile in place, friction drive wheels at the proximate longitudinal center of the said tracks, and adapted to be engaged by the wheels of the automobile, and means for propelling the said frame operated by the automobile wheels.

2. In a device of the character described, a frame mounted on wheels, parallel compound grooved rails on top of the said frame and adapted to receive the wheels of an automobile, inclined rails pivotally secured to the front ends of the first mentioned rails, an automobile mounted on top of the said frame on the said rails, friction drive wheels in engagement with the hind wheels of the automobile, a shaft rotated by the said friction drive wheels, belt wheels mounted on the outer ends of the said shaft, a gear wheel mounted at the longitudinal center of the said shaft, a second gear wheel in mesh with the first mentioned gear wheel, a shaft parallel with and in back of the first mentioned shaft and rotated by the second mentioned gear wheel, sprocket wheels mounted on the outer ends of the said shaft, and sprocket chains passing around the said sprocket wheels and around the sprocket wheels secured around the hubs of the hind wheels of the frame, for the purpose of propelling the said frame.

3. In a device of the character described, a wheel mounted frame, compound grooved tracks on top of the said frame, means for propelling the frame by the power of an automobile secured in the said rails on top of the said frame, and means for guiding the device, consisting of a large and small sprocket wheel, a sprocket chain passing around the said sprocket wheels, a jointed vertical rod on the lower end of which the small sprocket wheel is mounted, and a horizontal lever pivoted to the top of the said vertical rod so as to be free to move in a vertical plane only and of such length as to be easily operated by any one sitting in the seat of the automobile.

4. In a device of the character described, a wheel mounted frame, an automobile secured in grooved, compound, parallel rails on top of the said frame, adjusting blocks provided with binding screws for securing the automobile in position, grooved, rubber padded, friction drive wheels adapted to receive the hind wheels of the automobile and to be rotated thereby, and spur, and chain and sprocket propelling gear operated by the said friction drive wheels.

In witness whereof I have hereunto set my hand in the presence of two witnesses.

SIMON BELANGER.

Witnesses:
 THOMAS L. JONES,
 FRED MOODY.